Jan. 16, 1945.  D. B. NIVISON  2,367,602
MACHINE FOR BENDING TUBES
Filed Jan. 9, 1943  2 Sheets-Sheet 2
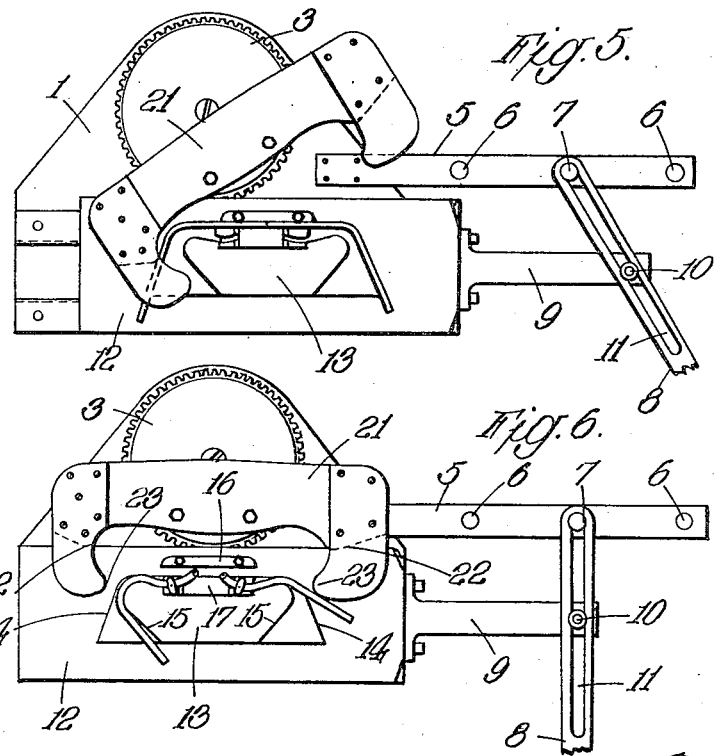
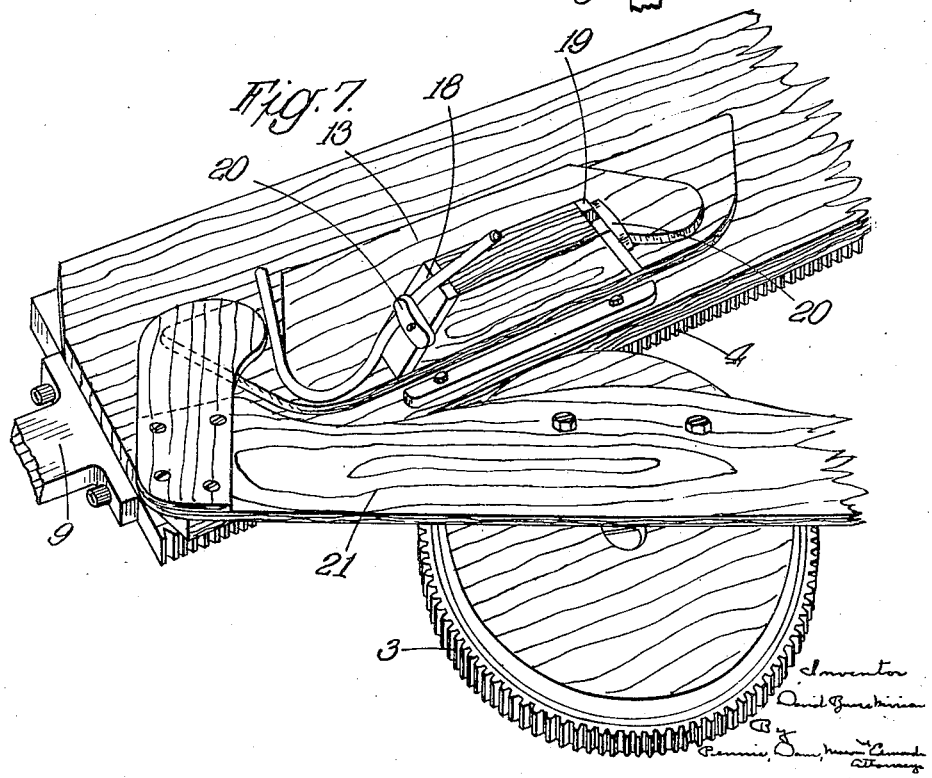

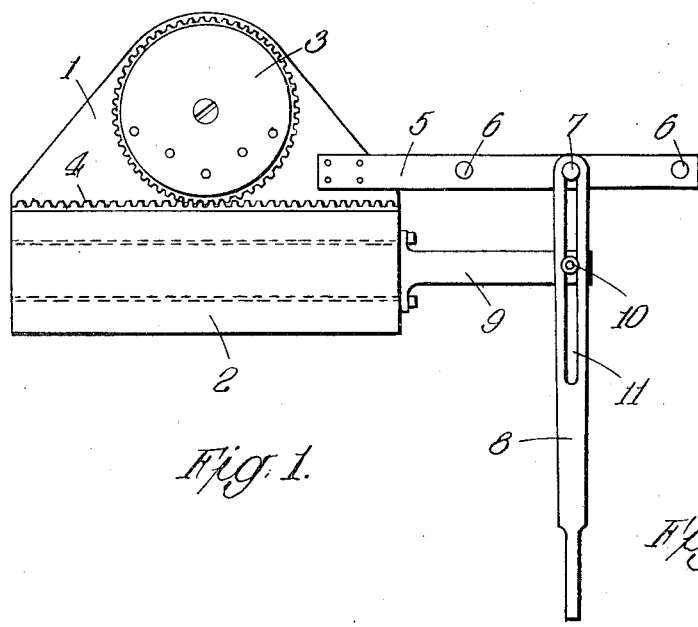
Fig. 1.  Fig. 2.
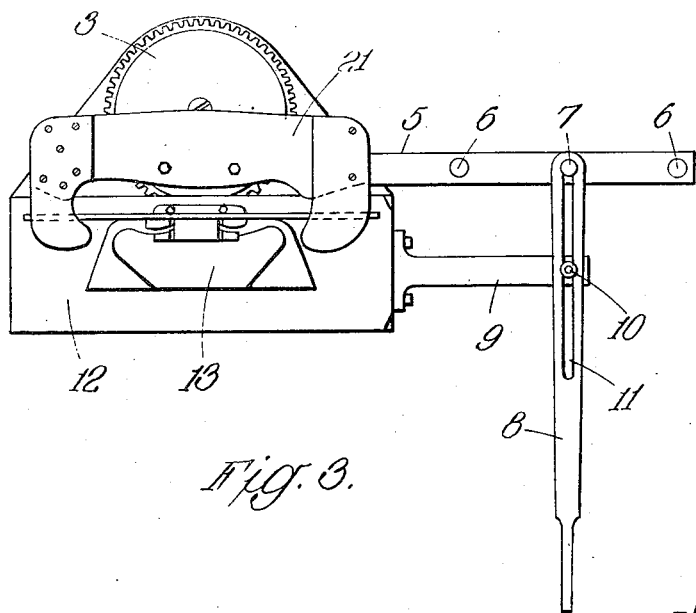
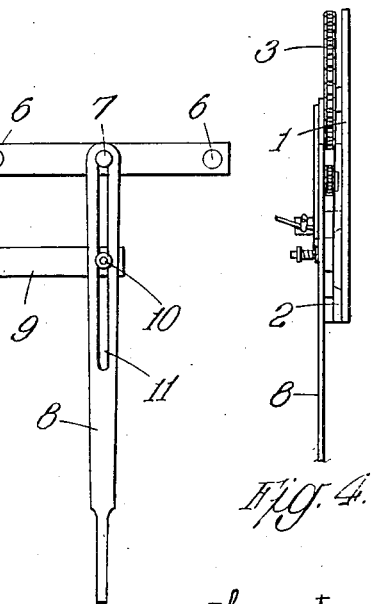
Fig. 3.  Fig. 4.

Patented Jan. 16, 1945

2,367,602

UNITED STATES PATENT OFFICE 2,367,602

MACHINE FOR BENDING TUBES

David Bruce Nivison, Brough, England, assignor to Blackburn Aircraft Limited, Brough, England Application January 9, 1943, Serial No. 471,826
In Great Britain December 19, 1941

9 Claims. (Cl. 153—46)

This invention relates to improvements in machines for bending tubes, in particular tubes of small diameters.

An object of the invention is to provide a simple machine for hand or power operation capable of making simple bends in one plane or bends in two or more planes at an angle to one another.

A further object of the invention is to provide such a machine for bending pairs of tubes with similar bends in one or more planes but of opposite hands respectively.

A still further object of the invention is to provide such a machine having changeable shaping members whereby different bending operations may be performed by the same machine.

According to the present invention the tube bending machine comprises a bed, a freely rotatable toothed disc thereon, a slide movable relatively to the bed along a path parallel to a tangent to the disc and having a rack which meshes with the teeth of said disc and a pair of co-operating members one of which is a thrust member mounted on the disc and the other of which is mounted on the slide and has a surface conforming to the desired shape of the bend to be imparted to the tube. The parts are so positioned relative to one another that on displacing the slide the disc is rotated and the thrust member carried thereby is rocked towards the shaping member to bend a tube located adjacent the latter to a shape defined thereby.

By giving both the thrust and shaping members a pair of opposed surfaces and by displacing the slide first in one direction and then in the opposite direction, to rock the thrust member so that one of its thrust surfaces co-operates with one of the shaping surfaces of the shaping member and then rock it in opposite direction so that its other thrust surface co-operates with the second shaping surface of the shaping member, a tube may be bent at two points or at opposite ends, or two tubes concentrically arranged may be bent with bends of opposite hands respectively. The opposed shaping surfaces may impart bends of different curvature to the two points or ends of a tube but where two concentrically arranged tubes are operated upon the two opposed shaping surfaces will be symmetrical in contour but oppositely arranged.

According to a further feature of the invention each of the pair of co-operating thrust and shaping members has two superimposed surfaces or pairs of surfaces, and tube holding clamping means are provided whereby after initial bending of a tube or pair of tubes by the cooperating thrust and shaping surfaces, or pairs of those surfaces, lying in the one plane the tube or tubes is or are turned through a desired angle and clamped in adjusted position in another plane for bending by the cooperating thrust and shaping surfaces or pairs of thrust and shaping surfaces lying in the other plane. In this way a tube may be bent with bends lying in two or more planes at an angle to one another and where the shaping members are designed to be double acting by being provided with pairs of opposed symmetrical shaping surfaces and the slide is displaced first in the one and then in the other direction, pairs of tubes may be bent with similar two dimensional bends but of opposite hand respectively. This is especially important when dealing with tubes of short length.

According to a still further feature of the invention locating means, conveniently comprising the points of attachment of the thrust and shaping members, are provided on the disc and on the slide whereby the thrust and shaping members may be replaced by other pairs of co-operating thrust and shaping members.

The slide may be displaced by power or by hand either by means of a lever or through a rack and pinion drive from a suitable operating handle.

The bed, slide and toothed disc will conveniently all be made of metal, whilst the thrust and shaping members may be made of wood, metal or other suitable material. It is to be noted that the thrust and shaping members are flat and have a contour designed to impart a desired shape to a tube and therefore they are simple and inexpensive to make. Where the thrust and shaping members have two superimposed surfaces they may be made by joining together two flat pieces having the desired respective contours at the shaping edges.

The clamping means employed where bends in two or more planes at an angle to one another are to be imparted to a tube, may vary according to the nature of the bend first imparted to the tube or tubes and in the main will consist of a part or recess to locate at least a portion of a tube and restrain it against angular displacement and means such as a turnbuckle or the like to hold the tube against said part or in said recess. As has been said the clamping means may take a variety of forms depending on the nature of the initial bend given to the tube or tubes and the making of such clamps is within the skill of a pattern maker and all the possibilities of clamping need not be elaborated here.

If desired or found necessary the tubes may be loaded or filled, to prevent crinkling at the bends, in any convenient manner known in the tube bending art.

In the operation of the machine the shaping member carried by the disc pushes on the tube and in some cases also slides therealong, thereby bending the tube to a shape defined by the contour of the co-operating shaping members.

In order that the invention may be clearly understood and readily carried into effect, an embodiment thereof is by way of example more fully described with reference to the accompanying drawings which are given for purposes of illustration only and not of limitation.

In these drawings:

Figure 1 is a plan view of the machine,

Figure 2 is a side elevation of the machine seen from the right-hand side of Figure 1, Figure 3 is a plan view of the machine having mounted thereon the devices for bending a pipe or pairs of pipes, Figure 4 is a side elevation seen from the right-hand side of Figure 3, Figure 5 is a view similar to Figure 3 showing the machine in one limit position having completed the first bending operation, Figure 6 is another view similar to Figure 3 in the same position of the machine during the second bending operation, and Figure 7 is a perspective view on a larger scale showing the bending devices during a second bending stage.

Referring now to the said drawings, the machine comprises a bed or base 1 on which is mounted for free movement a slide 2. Also mounted on the base 1 is a freely rotatable toothed wheel 3. Along the side edge of the slide 2 is a rack 4, the teeth of which mesh with the teeth of the toothed wheel 3 such that movement of the slide causes rotation of the wheel 3. A part 5 is made fast to the base 1 and is provided with one or more apertures 6 into one of which may engage a pivot 7 of an operating lever 8. An extension member 9 secured to the slide 2 carries a roller or equivalent member 10 which acts in a slot 11 in the operating lever 8. This arrangement is such that on rocking the lever 8 about its pivot 7, the slide is moved back and forth, during which time it rotates the wheel 3.

On the slide 2 is mounted a plate 12 and on this plate is mounted a former 13 having pairs of shaping surfaces 14, 14, 15, 15 arranged on different levels. Also mounted on the plate 12 is a member 16, so positioned as to leave a gap which is slightly larger than the diameter of the pipe to be bent between it and the edge of the former 13. A clamping block 17 is mounted on the former 13 and at the ends of this block are grooved pieces 18, 19 and buttons 20, or equivalent clamping devices for holding a tube in the pieces 18, 19. As can be seen in Fig. 7, the grooves in the pieces 18 and 19 are of such shape and so positioned with respect to the shaping member or former 13 as to be capable of receiving and holding a tube previously bent about one of the shaping surfaces 14.

A co-operating thrust member 21 is made fast to the wheel 3 and this thrust member has a pair of thrust surfaces 22, 22, and a further pair of thrust surfaces 23, 23. The former being arranged to co-operate with the pairs of shaping surfaces 14, 14 of the former 13, and the pair of thrust surfaces 23, 23 to co-operate with the shaping surfaces 15, 15 of the former 13, for which purpose they are situated at a higher level to lie in the plane of the surfaces 15, 15.

The base 1, slide 2, wheel 3 and the operating mechanism comprising the parts 5, 8 and 9 are conveniently all made of metal, whilst the plate 12, former 13 and co-operating shaping member 21 are made of wood. The pieces 18, 19 are conveniently made of strong material such as compressed fibre and if desired the thrust surfaces of the member 21 may be made of compressed fibre or other strong hard-wearing material.

In carrying out a bending operation with the tools described, to bend the pipes to the same shape but opposite hand, two straight lengths of pipe are located in the groove between the parts 13 and 16 as shown in Figure 3. The lever 8 is then moved to the left causing the surfaces 22 of the member 21 to force the tube to the shape of the shaping surfaces 14, which it does partly by pushing and partly by a sliding action. The lever 8 is then moved to the right so that the movement of the slide 2 in the opposite direction rotates the wheel 3 in the reverse direction to rock the member 21, so that the opposite surface 22 forces the other tube to the shape of the other surface 14. The tubes are now lifted from the groove between the parts 16 and 17 and are located in the grooves in the parts 18 and 19, in which they are retained by the buttons 20, the point of maximum curvature lying at the point where the grooves open onto the shaping surfaces 15. The handle 8 is now rocked first in one direction and then in the other so that the surfaces 23 force the tubes to the shapes of the shaping surfaces 15, which they again do partly by pushing and partly by sliding action. In Figure 6 the parts are shown during movement of the handle 8 towards the left with the surface 23 pushing on one of the tubes to force it to the shape of the surface 15. From the foregoing description it will be readily understood that two pipes are bent both with similar bends but of opposite hand.

It will be understood that in operation the imparting of the second-stage bends to the tube about the shaping surfaces 15 will be carried out simultaneously with the imparting of the first-stage bends to other tubes. Thus, while a straight tube is having the initial bend imparted to it by one of the shaping surfaces 14 and one of the thrust surfaces 22, a previously partially-bent tube secured in the groove in one of the parts 18 and 19 will have a bend in a second plane imparted to it. Hence a single movement of the thrust member 21 in one direction will cause the initial, or first-stage, bend to be imparted to one tube and the final, or second-stage, bend in a second plane to be imparted to an already partially bent tube. In the drawings only one bending operation is shown in each of the several figures in order not to confuse the illustration of the second bending operation.

It is not, however, essential that the pairs of shaping surfaces 14 and 15 are exactly alike, where it is required that one pipe be differently shaped from the other. It is furthermore not essential to bend two pipes, as it may alone be necessary to impart a bend in one plane or bend a single pipe at one point in two planes. When it is desired to bend a pipe or pipes to different shapes, the former 13 is replaced by another having shaping surfaces giving the desired configuration. With different shaping surfaces on the former 13, different thrust surfaces may be necessary on the thrust member 21. When that member is replaced by another having suitable thrust surfaces it is easily accommodated by loosening the holding bolts and re-positioning them in the original holes or in the alternative tapped holes provided for that purpose.

I claim:

1. A tube bending machine comprising a base, a toothed disc mounted for free rotation on said base, a slide movable relative to the base and having a rack which meshes with the teeth of said disc, a shaping member on said slide, a thrust member on said disc, and means for moving said slide in opposite directions, the thrust member on the disc and the shaping member on the slide being in adjacent opposed relation so that during movement of the slide in one direction said thrust member engages a portion of a tube held between said members and forces it against the shaping member to impart a bend of desired shape to the tube.

2. A tube bending machine comprising a base, a toothed disc mounted for free rotation on said base, a slide movable relative to the base along a path substantially parallel to a tangent to said disc, said slide having a rack which normally meshes with the teeth of said disc, a shaping member on said slide, a thrust member on said disc, and manually operable means for moving said slide in opposite directions, the thrust member on the disc and the shaping member on the slide being in adjacent opposed relation so that during movement of the slide in one direction said thrust member engages a portion of a tube held between said members and forces it against the shaping member to impart a bend of desired shape to the tube.

3. A machine for imparting a plurality of bends to a tube comprising a base, a toothed disc mounted for free rotation on said base, a slide movable relative to the base and having a rack which meshes with the teeth of said disc, a shaping member mounted on the slide and having a pair of shaping surfaces, a thrust member mounted on the disc and having a pair of thrust surfaces to cooperate with the pair of shaping surfaces of the shaping member, and means for moving the slide first in one direction and then in the other, the thrust surfaces of the thrust member and the shaping surfaces of the shaping member being in adjacent opposed relation so that when the slide is moved in one direction, one of the thrust surfaces of the thrust member will be rocked toward and engage a portion of a tube held between said members and force it into contact with one of the shaping surfaces of the shaping member to impart a bend of desired shape to said portion of the tube, and when the slide is moved in the opposite direction the other thrust surface of the thrust member will be rocked toward another portion of said tube and engage it and force it into contact with the other shaping surface of the shaping member to impart a bend of desired shape to that portion of the tube.

4. A tube bending machine comprising a base, a toothed disc mounted for free rotation on said base, a slide movable relative to the base along a path substantially parallel to a tangent to said disc, said slide having a rack which meshes with the teeth on said disc, a shaping member mounted on the slide and having at least two shaping surfaces, each in a separate plane, a thrust member mounted on the disc and having at least two thrust surfaces, each in a plane common to a corresponding shaping surface of said shaping member, and means for moving said slide in opposite directions, the thrust surfaces of the thrust member and the shaping surfaces of the shaping member being in adjacent opposed relation so that during movement of the slide in one direction rotation of the disc causes the thrust surfaces carried by the thrust member to be rocked toward the shaping member and one of the thrust surfaces to engage a tube held between it and its corresponding thrust member and force the tube against the corresponding shaping member to impart a bend of desired shape to the tube.

5. A tube bending machine comprising a base, a toothed disc mounted for free rotation on said base, a slide movable relative to the base and having a rack which meshes with the teeth of said disc, means for moving said slide to rotate said disc, a shaping member on said slide having at least one shaping surface conforming substantially to the shape to be given to a tube, means for holding a tube adjacent said shaping member, and a thrust member mounted on said disc for engaging the tube and forcing it about said shaping surface, when said disc is rotated, to impart a bend of desired shape thereto, said shaping member and said thrust member being in addition to the teeth of said disc and said rack.

6. A pipe bending machine comprising a base, a toothed disc mounted for free rotation on said base, a slide movable relative to the base and having a rack which meshes with the teeth of said disc, a shaping member on said slide having two superimposed surfaces corresponding to different shapes to be given to a tube, means for holding a tube adjacent one of said surfaces, means for holding another tube adjacent the other of said surfaces, a thrust member on said disc having two superimposed thrust surfaces, the shaping and thrust surfaces being in adjacent opposed relation, and means for moving said slide in opposite directions to rotate said disc to cause the thrust member to move toward the shaping member and its thrust surfaces to engage tubes held between them and their corresponding shaping surfaces and simultaneously force both tubes about the respective shaping surfaces to impart the desired bends to them.

7. A machine for imparting a plurality of bends to a tube comprising a base, a toothed disc mounted for free rotation of said base, a slide movable relative to the base and having a rack which meshes with the teeth of said disc, a shaping member on said slide having two opposite shaping surfaces, means for holding at least one tube adjacent said shaping member, means on said disc having oppositely extending thrust surfaces, and means for moving said slide first in one direction and then in the other direction, said thrust surfaces and the shaping surfaces being in adjacent opposed relation so that when the slide is moved in one direction rotation of the disc causes the thrust member to be rocked in one direction and one of the thrust surfaces will be rocked toward and force a portion of a tube held between it and its corresponding shaping surface into contact with said shaping surface to impart a bend of desired shape to said portion of the tube, and when the slide is moved in the opposite direction rotation of the disc causes the thrust member to be rocked in the opposite direction and the other thrust surface to be rocked towards its corresponding shaping surface and force another portion of said tube into contact with said shaping surface to impart a bend of desired shape to that portion of the tube.

8. A machine for imparting a plurality of bends to tubes comprising a base, a toothed disk mounted for rotation on the base, a slide movable relative to the base and having a rack which meshes with the teeth of the disk, a shaping member mounted on the slide and having a pair of oppositely directed shaping surfaces having shapes corresponding to the contours of initial or first-stage bends to be imparted to tubes and a second pair of oppositely directed shaping surfaces having shapes corresponding to the contours of second stage bends to be imparted to tubes having the first-stage bends, the shaping surfaces of the respective pairs lying in different planes, a thrust member mounted on the disk and having two pairs of oppositely directed thrust surfaces cooperating, respectively, with the two pairs of shaping surfaces, means for moving the slide first in one direction and then in the other to cause oscillation of the disk and rocking of the thrust member, the cooperating pairs of shaping and thrust surfaces being in adjacent opposed relation so that movement of the slide in one direction causes one thrust surface of each pair to engage and bend tubes between them and their respective cooperating shaping surfaces to shapes defined by the respective cooperating shaping surfaces, and movement of the slide in the opposite direction causes the other thrust surface of each pair to engage and bend tubes between them and their respective cooperating shaping surfaces to shapes defined by such respective cooperating shaping surfaces, and means for holding the tubes during the second-stage bending, said means being shaped so as to be capable of holding a tube having the second-stage bend imparted thereto.

9. A machine for imparting a plurality of bends to tubes comprising a base, a toothed disk mounted for rotation on the base, a slide movable relative to the base and having a rack which meshes with the teeth of the disk, a shaping member mounted on the slide and having a pair of oppositely directed shaping surfaces having shapes corresponding to the contours of initial or first-stage bends to be imparted to tubes and a second pair of oppositely directed shaping surfaces having shapes corresponding to the contours of second stage bends to be imparted to tubes having the first-stage bends, the shaping surfaces of the respective pairs lying in different planes, a thrust member mounted on the disk and having two pairs of oppositely directed thrust surfaces cooperating, respectively, with the two pairs of shaping surfaces, and means for moving the slide first in one direction and then in the other to cause oscillation of the disk and rocking of the thrust member, the cooperating pairs of shaping and thrust surfaces being in adjacent opposed relation so that movement of the slide in one direction causes one thrust surface of each pair to engage and bend tubes between them and their respective cooperating shaping surfaces to shapes defined by the respective cooperating shaping surfaces, and movement of the slide in the opposite direction causes the other thrust surface of each pair to engage and bend tubes between them and their respective cooperating shaping surfaces to shapes defined by such respective cooperating shaping surfaces.

DAVID BRUCE NIVISON.